United States Patent [19]  [11]  4,343,706
Etzel et al.  [45]  Aug. 10, 1982

[54] METHOD OF REMOVING HEAVY METALS FROM INDUSTRIAL WASTE STREAMS

[75] Inventors: James E. Etzel; Praveen Anand, both of West Lafayette, Ind.

[73] Assignee: Purdue Research Foundation, West Lafayette, Ind.

[21] Appl. No.: 174,987

[22] Filed: Aug. 4, 1980

[51] Int. Cl.³ .................................................. C02F 1/52
[52] U.S. Cl. ...................................... 210/667; 75/109; 210/711; 210/712; 210/717; 210/724; 210/912; 210/913; 423/140
[58] Field of Search ................. 210/667, 702, 710–712, 210/717, 723–728, 738, 912–914, 688; 75/108, 109; 423/140, 594

[56]  References Cited

U.S. PATENT DOCUMENTS

| | | | |
|---|---|---|---|
| 2,128,569 | 8/1938 | Velz | 210/711 |
| 3,347,786 | 10/1967 | Baer et al. | 210/708 |
| 3,494,864 | 2/1970 | Willihnqanz | 210/708 |
| 3,725,266 | 4/1973 | Haviland | 210/710 |
| 3,800,024 | 3/1974 | Forsell et al. | 210/710 |
| 4,040,955 | 8/1977 | Davidson | 210/708 |
| 4,163,716 | 8/1979 | Turnbull | 210/665 |
| 4,210,530 | 7/1980 | Etzel et al. | 210/904 |
| 4,222,872 | 9/1980 | Ramirez | 210/688 |

FOREIGN PATENT DOCUMENTS

| | | | |
|---|---|---|---|
| 51-62182 | 5/1976 | Japan | 210/710 |
| 55-107742 | 8/1980 | Japan | 75/108 |

OTHER PUBLICATIONS

Anand, "Eval. of a Chem. Coagulation & Coagulant Reuse Process for Treating Heavy Metal Waste," Purdue University, Thesis, Apr. 27, 1979.

Primary Examiner—Peter A. Hruskoci
Attorney, Agent, or Firm—Biebel, French & Nauman

[57]  ABSTRACT

Heavy Metals contained in industrial waste streams are removed therefrom by flocculation using a source of ferric ions and an alkaline material at a basic pH. Both the flocculated heavy metals and the coagulant chemicals are recovered by acidifying the floc to a pH of between 3.2 and 3.7. This liberates the heavy metals back into solution but does not destroy the floc particles. After separation and removal of the concentrated heavy metal solution, the floc is further acidified to completely dissolve it. This dissolved ferric ion containing solution may then be reused to treat succeeding portions of heavy metal containing waste streams. The concentrated heavy metals solution may also be recycled or the metals contained therein recovered for reuse or disposed of in an acceptable manner.

6 Claims, No Drawings

METHOD OF REMOVING HEAVY METALS FROM INDUSTRIAL WASTE STREAMS

BACKGROUND OF THE INVENTION

This invention relates to a method of wastewater purification with recovery of heavy metals contained therein, and more particularly to a method of coagulating metal containing wastes from industrial waste streams with subsequent recovery of those metals and reuse of the coagulant.

Metal plating and metal finishing are commonly used processes to improve surface properties of metallic and nonmetallic articles. Electroplating is the most common and important of the various metal plating processes. Metals commonly used in these processes include nickel, copper, iron, lead, chromium, zinc, gold, silver, cadmium and tin. Such metals are commonly referred to as "heavy metals" in part due to their potentially toxic effects. As used in this specification, the term "heavy metals" will encompass any metal known to have a potential toxic effect on animal or plant life and which can be removed by precipitation or flocculation.

Waste water from the various industrial metal plating and finishing operations amounts to several billion gallons per year in the United States alone. Major sources of these wastes include drag-out losses carried into rinse waters by the plated piece or the rack holding it, solution dumping of spent, spoiled, or obsolete solutions (rarely done unless remedial measures fail), and tank leakage losses. Although trace amounts of metals in water supplies are not harmful, their presence in concentrations of as little as 0.05 ppm in some cases can have potentially toxic effects on animal and aquatic life. Additionally, unlike organic pollutants which eventually degrade to harmless materials, metals are not subject to degradation and may pass along food chains where they tend to accumulate, reaching concentrations in excess of that which originally existed in the air or water.

For this reason, the U.S. Public Health Service has established drinking water standards setting maximum acceptable concentrations of metals in water supplies. A more detailed and comprehensive listing of the toxic effects of metal containing waste streams can be found in an Environmental Protection Agency publication entitled "Water Quality Criteria Data Book, Volume 3, Effects of Chemicals on Aquatic Life" (Pub. No. 18050 GNV 05/71). As can be seen, there is a need for an effective means for removing such heavy metals from waste streams to avoid pollution of drinking water supplies. Of course, this need has been recognized, and numerous attempts have been made to treat effectively metal containing waste streams. These methods have included dilution and discharge into sewers or water courses; evaporation, dialysis, and electrodialysis; reverse osmosis; neutralization-precipitation; and ion exchange.

Of these methods, neutralization-precipitation has been among the most commonly used. Such treatment involves the addition of basic materials such as sodium or calcium hydroxide or the like to a metal containing waste stream to precipitate heavy metals as their insoluble hydroxides. In many instances, other chemical additives such as settling aids or coagulants are also added. In the prevalent industrial practice, the precipitated heavy metal flocs (hydroxides) are then separated from the stream and then disposed of on landfill sites. However, many disposal sites are inadequate because of potential ground and surface water contamination caused by resolubilization of the metals. Even carefully selected landfill sites may present long term disposal problems according to the Environmental Protection Agency's Hazardous Waste Management Division. See, "Assessment of Industrial Hazardous Waste Practices; Electroplating and Metal Finishing Industries—Job Shops" (Pub. No. PB-264349, September 1976). Moreover, neutralization and precipitation of heavy metals consumes large amounts of increasingly expensive chemicals and generates large volumes of sludge to be disposed of on scarce landfill sites.

Accordingly, the need still exists in the art for an efficient and relatively inexpensive method of removing heavy metals from waste streams which does not generate large volumes of sludge or other disposal problems.

SUMMARY OF THE INVENTION

In accordance with the present invention, heavy metals contained in a waste stream are removed from solution by a coagulant composition containing a water soluble ferric ion salt and an alkaline material. As the salt, any water soluble ferric ion containing salt may be utilized such as ferric chloride or ferric sulfate. As the alkaline material, calcium or sodium hydroxide or calcium or sodium carbonate may be utilized. The amount of alkaline material added should be sufficient to raise the pH of the stream to from about 10.2 to 10.7.

When added to the heavy metal containing waste stream, a ferric hydroxide floc is formed which acts as a cation exchange material to bind the heavy metal ions in the floc. After settling of the flocculated material, the stream is essentially free of all heavy metal ions and may be either recycled to the metal plating or finishing process or may be safely discharged into a sewer or stream. The concentrated floc containing the heavy metals is then treated with a strong mineral acid such as sulfuric acid to lower its pH to about 3.2 to 3.7.

At this pH of from between about 3.2 and 3.7, the floc will release essentially all of the heavy metals bound to it back into solution in a manner analogous to the flushing and regeneration of a cation exchange resin material. After settling, a clear, colorless layer of liquid containing essentially all of the heavy metals forms on top of the coagulant layer. This colorless layer can be drawn off and the metals concentrated therein can be recycled to a metal plating or other process and reused or disposed of in an acceptable manner.

The coagulant layer, now containing ferric hydroxide floc, may be completely dissolved by the addition of a small amount of a strong mineral acid such as sulfuric acid which lowers the pH to about 3 or below. The flocculent material (now present in the form of a ferric ion salt) can then be reused to treat another heavy metal containing waste stream.

Accordingly, it is an object of the present invention to provide an efficient and relatively inexpensive method for removing heavy metals from waste streams without the creation of large volumes of sludge; it is a further object of the invention to remove these metals in a manner so that they may be reused and so that the flocculent material used to remove them may also be reused. These and other objects and advantages of the invention will become apparent from the following description and the appended claims.

DESCRIPTION OF THE PREFERRED EMBODIMENTS

Removal of heavy metals from an industrial waste stream in accordance with the practice of this invention is based in part on the ion exchange capabilities of ferric hydroxide flocs. This ion exchange capability has been recognized previously. Faust et al, *Principles and Applications of Water Chemistry*. Ferric ions do not exist as such in aqueous solutions but rather form positively charged aquo complexes with water molecules. These aquo complexes undergo a series of hydrolytic reactions which give rise to colloidal hydroxo-metal complexes. Hydroxo-metal complexes have a pronounced tendency to polymerize and form highly charged colloidal particles. As the pH of an aqueous solution is raised, the relative number of complexed hydroxyl ($OH^-$) ions will increase to a point at which the hydroxo-metal complex will interact with and bind cations. Lowering the pH has the reverse effect, and at pH values below the isoelectric point, the complex will interact with anions.

Independent of the ion exchange capabilities of a metal hydroxide is its solubility in an aqueous solution. For example, if the amount of an iron salt added to a solution exceeds the solubility of the hydroxide of iron and the pH of the solution is such that hydroxide formation will occur, the iron hydroxide will form a floc and precipitate out of solution.

In accordance with the present invention a water-soluble iron salt and an alkaline material are added to an industrial waste stream containing heavy metals to remove those metals from the stream. The water soluble iron salt serves as a source of ferric ions which, at an elevated pH, forms a ferric hydroxide floc. Examples of suitable iron salts include ferric chloride, ferrous or ferric sulfate, and mixtures thereof. The amount of iron required to be added to a given waste stream will vary somewhat depending upon the exact pH of the stream and the type of waste being treated. However, the minimum amount may be easily determined by adding the iron salt to the waste stream until a visible floc is formed. The addition of more iron salt may be required if large concentrations of heavy metals are present in the waste stream.

The alkaline material added to the waste stream serves to elevate the pH of that stream to provide conditions favorable for ferric hydroxide floc formation. Any alkaline material capable of raising the pH of the waste stream above 10 can be utilized. Examples of suitable materials include sodium or calcium hydroxides, or carbonates.

Although there will be some heavy metal removal from the waste stream by the floc at a pH range of between 8 and 10, it has been found that optimum removal occurs at pH's of between 10.2 and 10.7. In this range, essentially all (i.e., greater than 99%) heavy metals are bound by the floc and removed from the waste stream. Good results can also be obtained at pH's greater than 10.7; however, since essentially all heavy metals can be removed from a waste stream when operating at a pH level of 10.2–10.7, the additional alkaline chemicals required to further elevate the pH merely add to the costs of operating the process.

After the floc has formed, some mixing should be provided to insure good contacting of the floc and the waste stream. The floc is then permitted to settle, and the waste stream may be drawn off and either recycled or safely discharged to a sewer or water course. The floc containing the heavy metals is then treated with a strong mineral acid such as hydrochloric acid or sulfuric acid. Acid is added with mixing until the pH of the floc reaches about 3.2 to 3.7. At this point, the ferric hydroxide floc has passed the isoelectric point but has not yet dissolved. At this pH level, the hydro-metal complexes which form the floc become positively charged because of the excess of hydrogen ions over negatively charged hydroxyl ions, and the floc releases the positively charged heavy metal ions into solution except for ferric ions which are retained by the floc.

After settling, two distinct layers appear. A top colorless aqueous layer contains the redissolved heavy metal ions while the bottom layer contains the floc. This top layer containing concentrated levels of heavy metals can be drawn off and the metals recovered for reuse or disposed of. For example, if the waste stream contained only a single heavy metal species, the concentrate could be recycled directly to a metal plating or finishing process. Alternatively, a mixture of metals could be recovered by sending the concentrate through a vermiculite ion exchange column or series of columns as taught by Etzel, U.S. Pat. No. 4,100,065, and Etzel et al copending U.S. application No. 13,929, filed Feb. 22, 1979, now U.S. Pat. No. 4,210,530.

The remaining floc layer is then treated with additional strong mineral acid which lowers the pH of the floc layer to about 3 or below and dissolves the floc. For example, if sulfuric acid is used as the strong acid, the ferric hydroxide floc will be converted to soluble ferric sulfate which can then be used directly as a source of ferric ions to treat another heavy metal containing waste stream. It has been found that there is no buildup of other heavy metals in the floc over repeated cycles of the process. Additionally, although there is some loss (10% or less) of ferric ions during each cycle, it can be appreciated that significant savings in chemical costs are achieved through repeated use of the ferric ions in addition to the savings on landfill costs because of the lack of sludge formed by the process of this invention. Moreover, if the waste stream initially contains iron in the form of ferrous or ferric ions, that iron will be retained in the floc and will be recovered during the final stage of the process for use, reducing or eliminating the need for the addition of make-up amounts of ferric ions when a succeeding treatment is initiated. In order to better understand the process of the present invention, reference is made to the following nonlimiting examples.

EXAMPLE 1

A simulated industrial waste stream was prepared by dissolving sources of cadmium, copper, iron, lead, nickel, and zinc into an aqueous solution so that the resulting concentration of each heavy metal ion was approximately 60 mg/l. 500 ml samples of this solution were placed in 1000 ml beakers. Sodium hydroxide was then added to adjust the pH's of the various samples to between about 7 and 10.5. Calcium hydroxide and ferric chloride in the amounts of 250 mg/l and 200 mg/l, respectively, were then added to the solution with mixing. All samples were flocculated with mixing for 30 minutes, and the floc was then allowed to settle for 90 minutes. Samples were then taken from the solution and measured on a Perkin Elmer Model 603 atomic absorption spectrophotometer to evaluate the concentrations of the various metals remaining in solution. The results are reported in Table I below.

| Sample No. | Initial pH | Adj pH | Final pH | Cadmium mg/l | Copper mg/l | Iron mg/l | Lead mg/l | Nickel mg/l | Zinc mg/l | 2N NaOH added per Adj |
|---|---|---|---|---|---|---|---|---|---|---|
| 1 | 2.65 | 7.30 | 7.30 | 10.35 | 0.075 | 0.25 | 0.35 | 1.235 | 1.70 | 5.0 mls |
| 2 | 2.86 | 8.00 | 8.50 | 1.625 | 0.05 | 0.25 | 0.35 | 0.3125 | 0.04 | 5.20 mls |
| 3 | 2.86 | 8.50 | 9.60 | 0.176 | 0.021 | 0.0833 | 0.058 | 0.03125 | 0.058 | 5.50 mls |
| 4 | 2.70 | 8.95 | 10.00 | 0.095 | 0.0167 | 0.0833 | 0.058 | 0.0167 | 0.054 | 5.70 mls |
| 5 | 2.85 | 10.15 | 10.50 | 0.058 | 0.0167 | 0.0833 | 0.058 | 0.0146 | 0.0625 | 6.10 mls |
| 6 | 2.85 | 10.40 | 10.60 | 0.058 | 0.0210 | 0.0833 | 0.058 | 0.0146 | 0.0710 | 6.30 mls |
| Initial Concentration | | | | 57.50 | 63.75 | 62.50 | 60.00 | | 58.375 | |

As can be seen, at pH's of 10 or above, the effectiveness of the floc in removing heavy metals from the simulated waste stream exceeded 99% efficiency.

EXAMPLE 2

A series of tests were run to determine whether the ferric hydroxide floc could be recovered and reused to flocculate succeeding waste streams without build-up of heavy metals in the recovered floc material. Six 500 ml samples of the synthetic heavy metal waste stream of Example 1 were flocculated with 250 mg/l of calcium hydroxide and 200 mg/l of ferric chloride while maintaining the pH of the samples between 10.2 and 10.5. The samples were flocculated with mixing for a period of 30 minutes and then allowed to settle for 90 minutes. Samples were withdrawn from the solution and measured in the atomic absorption spectrophotometer to evaluate the concentrations of heavy metals remaining in solution. The concentrated floc from each sample was transferred to a beaker where it was carefully acidified by the addition of 1 N sulfuric acid until the heavy metals contained in the floc were liberated but the floc particles were still intact. On the average for each cycle, about 1960 mg of sulfuric acid was added and a pH of 3.5–3.7 was achieved. The floc was agitated for 30 minutes and permitted to settle for 60 minutes to insure adequate mixing and separation. A top colorless layer containing the liberated heavy metals was drawn off. The bottom layer containing the floc was then treated with an additional 98 mg of sulfuric acid until the floc particles were completely dissolved. This recovered solution was then used to flocculate another series of simulated waste stream samples. This series of steps was then repeated for a total of ten cycles. The amount of recovered solution used in each subsequent recycle was adjusted by determining the iron content of the solution using the atomic absorption spectrophotometer so that equal amounts of iron were added to each cycle. The results are reported in Tables II and III below. All concentrations are reported in mg/l.

TABLE II

Total Metal Concentration in Solution After Flocculation

| Cycle No. | pH | Cadmium | Copper | Iron | Lead | Nickel | Zinc | Cumulative |
|---|---|---|---|---|---|---|---|---|
| 0 | 10.25 | 0.0625 | 0.026 | 0.0625 | 0.058 | 0.03125 | 0.0620 | 0.30225 |
| 1 | 10.30 | 0.0710 | 0.032 | 0.0935 | 0.050 | 0.0305 | 0.0455 | 0.3225 |
| 2 | 10.20 | 0.0755 | 0.033 | 0.08325 | 0.050 | 0.0396 | 0.04685 | 0.3282 |
| 3 | 10.35 | 0.048 | 0.0205 | 0.074 | 0.058 | 0.0262 | 0.0426 | 0.2693 |
| 4 | 10.30 | 0.048 | 0.0344 | 0.0833 | 0.058 | 0.0204 | 0.0497 | 0.2938 |
| 5 | 10.35 | 0.051 | 0.0160 | 0.0833 | 0.0416 | 0.0186 | 0.02775 | 0.23825 |
| 6 | 10.30 | 0.070 | 0.0262 | 0.055 | 0.058 | 0.036 | 0.048 | 0.2932 |
| 7 | 10.30 | 0.061 | 0.027 | 0.0833 | 0.060 | 0.0356 | 0.055 | 0.3220 |
| 8 | 10.35 | 0.0471 | 0.027 | 0.0833 | 0.070 | 0.0200 | 0.038 | 0.2854 |
| 9 | 10.40 | 0.0457 | 0.0235 | 0.0833 | 0.058 | 0.028 | 0.054 | 0.2925 |
| 10 | 10.40 | 0.059 | 0.029 | 0.0833 | 0.065 | 0.044 | 0.055 | 0.3353 |

TABLE III

Heavy Metals Buildup in Recovered Coagulant Solution

| Cycle No. | pH | Cadmium | Copper | Iron | Lead | Nickel | Zinc | Cumulative |
|---|---|---|---|---|---|---|---|---|
| 1 | 3.40 | 0.52 | 0.600 | 41.60 | 0.30 | 0.420 | 0.640 | 44.08 |
| 2 | 3.50 | 0.45 | 0.725 | 40.00 | 0.25 | 0.675 | 0.450 | 42.55 |
| 3 | 3.50 | 0.418 | 0.7425 | 41.60 | 0.275 | 0.880 | 0.506 | 44.42 |
| 4 | 3.50 | 0.480 | 0.800 | 41.60 | 0.240 | 0.700 | 0.568 | 44.39 |
| 5 | 3.30 | 0.4345 | 0.715 | 41.25 | 0.220 | 0.427 | 0.478 | 43.52 |
| 6 | 3.60 | 0.598 | 0.455 | 39.60 | 0.325 | 0.276 | 0.390 | 41.64 |
| 7 | 3.60 | 0.480 | 0.960 | 40.65 | 0.240 | 0.960 | 0.564 | 43.85 |
| 8 | 3.60 | 0.403 | 0.748 | 39.65 | 0.250 | 0.780 | 0.380 | 42.21 |
| 9 | 3.50 | 0.480 | 0.880 | 40.00 | 0.400 | 0.840 | 0.456 | 43.05 |
| 10 | 3.50 | 0.400 | 0.520 | 40.00 | 0.240 | 0.800 | 0.440 | 42.40 |

As can be seen, the recovered coagulant solution remained effective in removing over 99% of the heavy metals contained in the simulated waste streams over a period of 10 cycles. As shown by Table II, no discernible decrease in efficiency was observed. The results shown in Table III indicate that there was no heavy metals build-up in the recovered coagulant solution over a period of 10 cycles indicating that the iron flocculating material could be recycled indefinitely in the process without danger of build-up of other metals.

What is claimed is:

1. A method of treating an industrial aqueous waste stream containing one or more ionized heavy metal compounds of the type releasable from a ferric hydroxide flocculant at a pH of about 3.2 to 3.7 to remove such ionized heavy metal compounds comprising the steps of:

(a) adding a source of ferric ions and an alkaline material to said waste stream in amounts sufficient to raise the pH of the stream to about 10.2 or above and mixing to form a ferric hydroxide flocculent, whereby said flocculent binds said heavy metal compounds to yield a flocculated material containing said heavy metal compounds, (b) settling and separating the flocculated material from the stream, (c) acidifying said flocculated material by addition of an acid in an amount sufficient to lower the pH to about 3.2 to 3.7 and mixing whereby heavy metals bound by said flocculent are released into solution, (d) removing the heavy metal containing solution from said flocculent, (e) regenerating said flocculent by addition of an acid in an amount sufficient to lower the pH to about 3 or less and mixing to dissolve the flocculent and (f) recycling said dissolved flocculent to step (a).

2. The method of claim 1 in which said source of ferric ions is selected from the group consisting of ferric chloride, ferric sulfate, and mixtures thereof.

3. The method of claim 2 in which said alkaline material is selected from the group consisting of sodium hydroxide, calcium hydroxide, sodium carbonate, calcium carbonate, and mixtures thereof.

4. The method of claim 1 including the step of recycling the stream from step (b) to an industrial process.

5. The method of claim 1 including the step of recovering the heavy metals from step (d) for reuse in an industrial process.

6. The method of claim 1 including the step of passing the removed heavy metals from step (d) through a packed bed of vermiculite particles having a cation-exchange capacity in order to capture said heavy metals on said vermiculite particles.

* * * * *